L. DEFENBAUGH.
Corn-Planter.

No. 196,641. Patented Oct. 30, 1877.

WITNESSES:
C. Clarence Poole
Aug. Jordan

INVENTOR:
Lewis Defenbaugh
By his Atty. R. O. O. Smith

UNITED STATES PATENT OFFICE.

LEWIS DEFENBAUGH, OF KOKOMO, INDIANA.

IMPROVEMENT IN CORN-PLANTERS.

Specification forming part of Letters Patent No. 196,641, dated October 30, 1877; application filed September 10, 1877.

*To all whom it may concern:*

Be it known that I, LEWIS DEFENBAUGH, of Kokomo, Howard county, in the State of Indiana, have invented new and useful Improvements in Corn-Planters; and that the following is a full and accurate description of the same.

My device is designed for use on soil which is dry and sandy, such as exists in Kansas and in other portions of the United States where drouths are common; and its object is to plant the seed at the bottom of a furrow, nearer the line of constant moisture than when planted at or near the surface in the usual way, whereby the roots are less liable to be affected by drouth, and the gradual filling up of the furrow will cause the roots to be more and more deeply covered and protected by the earth irrespective of any artificial cultivation.

In these respects—*i. e.*, protection from drouth and protection from exposure—my plan and apparatus are diametrically the opposite of the method and apparatus whereby the seed is planted upon a ridge thrown up by the plowshare, and which not only leaves the roots exposed more to the action of the atmosphere, but requires constant replacement to prevent entire exposure by the degradation of the surface under the action of the natural elements.

I am aware that a corn-planter has been made whereby two furrows were made, and the earth from both thrown together in a median line, so as to form a ridge above the general surface, in which ridge the seed is planted.

The difference between this old method and device and my new method and device is clearly pointed out above.

My apparatus may be readily modified so as to perform other operations in the cultivation of corn, &c., than the planting of the seed, and these will hereinafter be described.

Having now set forth the nature of my invention, I will more particularly point out and describe the structure of the apparatus which I have devised to effect the object mentioned, having reference to the accompanying drawings, wherein—

Figure 1:
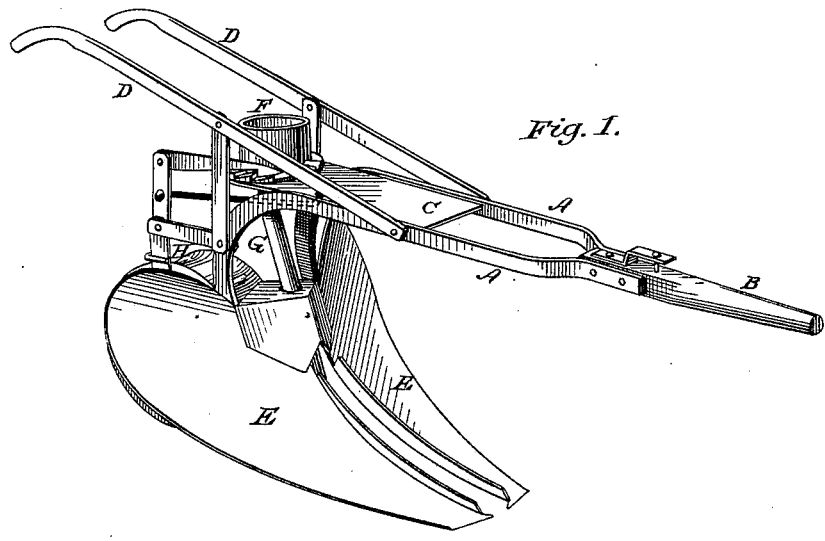
Figure 2:
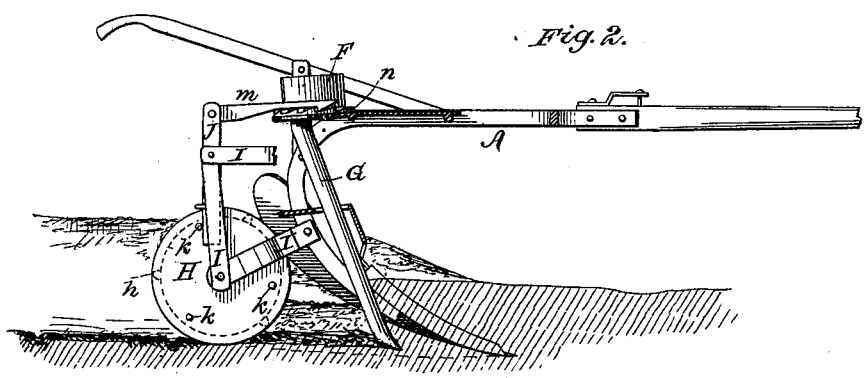
Figure 3:
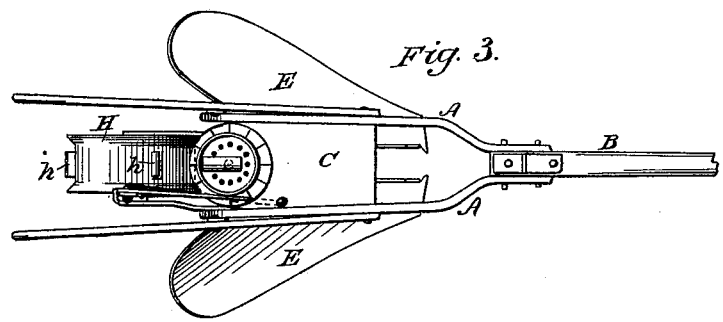

Figure 1 is a perspective view of my machine. Fig. 2 is a longitudinal section of the same. Fig. 3 is a plan view of the same.

A A are two plow-beams joined at their front ends to the rear end of the tongue or pole B, whereby the draft power is applied to propel the apparatus. C is a spacing-section, which is secured between the plow-beams to limit their distance apart, and D D are the guiding-handles. E E are plowshares, the one right and the other left hand, severally attached to the plow-beams A A, so that they each turn a furrow outwardly, and thereby produce a trench below the general surface.

It is desirable to plant the seed deep as possible below the general surface, to prevent drouth, and therefore that the seed should be planted below the bottom of the trench, but yet in pulverized soil. I, therefore, place the plowshares E E about four inches asunder, and with their land-side edges parallel, so that there will remain a section of earth about four inches in thickness along the middle of the furrow. This section of earth will, of course, be broken, and will fall down, so as to form a slight ridge along the bottom of the furrow.

A seed-hopper, F, is located upon the beams A, or upon the connecting-piece, and the bottom of said hopper is provided with some suitable automatic mechanism for delivering the grain in proper quantity and interval to a boot, G, which extends thence downward to the very bottom of the furrow, midway through the space intervening between the plowshares E E, and terminates in a tooth, which opens a light furrow to receive the seed as it passes down through said boot. If the section of soil untouched by the shares E E was not by their action completely broken up its rupture and disintegration would be insured by the boot G. The seed is therefore planted in a suitably-prepared bed along the bottom of a furrow or trench below the general surface, and, therefore, nearer to the line of permanent moisture, and correspondingly less liable to be affected by drouth.

The wheel H follows after the boot G and presses the loose soil down over the seed, and completely and effectually covers it.

The wheel H is journaled in a frame, I, which is fastened to and projects back from the beams A A. Said wheel is concave on its face, so as to press the earth lightly toward the center as it passes. Upon its face there are three, more or less, transverse ribs or projections, *h*, which are so located, as respects the circumference of said wheel and the distance of its center from the point of the boot G, that one of them will depress the surface of the soil, and thereby mark exactly the spot occupied by the planted seed. These slight depressions in the soil, being visible to the eye of the attendant in the adjacent planted rows, afford a check upon the performance of the machine, because it is desirable that they should be in line transversely, and if they are not so in line the field cannot be cross-plowed. The eye can immediately detect any deviation from the proper accuracy of planting, and the machine may be correspondingly adjusted from time to time by turning the wheel.

A lever, J, is pivoted to one of the bars of the frame I, and at its lower end it projects down by the side of the wheel H, so as to successively engage with each one of a series of pins, $k$, (which correspond in number with the number of the ribs $h$,) so that at each revolution of said wheel said lever is moved as often as there are pins $k$ in said wheel. At its upper end a hook-bar, $m$, is pivoted, and the hook end of said bar rests upon and, at each reciprocation, actuates a circular rack-plate, $n$, whereby the seed within the hopper F is discharged in regular quantities and at uniform distances, and, passing down through the boot G, is delivered in the trench and covered with the soil by the wheel H. A suitable spring retracts the lever J after each vibration.

In the drawing hereto attached, the seed-hopper F is represented as attached to and rotating with the rack-plate $n$; but it is evident other methods of structure and operation may be employed without in any degree departing from the spirit of my invention.

By removing the spacing-piece C the plows E E may be set close together, and, the planting mechanism having been removed, a plain ditch-furrow may be turned, to be used for surface drainage or otherwise, as desired.

By replacing the spacing-piece C with a wider one, or with arched iron bridge-pieces, and transposing the shares, a straddle-row corn-plow may be capable of cultivating the soil and throwing it toward the center.

Having described my invention, what I claim as new is—

1. A corn-planter provided with two plowshares—right and left hand—arranged to turn both furrows outward, and thus leave a trench or ditch, combined with an automatic dropping mechanism to deposit the seed in regular quantities and at regular intervals, as set forth.

2. A corn-planter provided with two shares, E E—right and left hand—arranged parallel with each other, but with an intervening space, combined with the seed-hopper and automatic distributer, and the pointed boot G, located between the shares, for the purpose set forth.

3. The right and left hand shares E E, set parallel with, but more or less distant from, each other, and an automatic seed distributer and hopper attached thereto, combined with the tubular boot G and the conveying-roller H, provided with the marking-ribs $h$, for the purpose set forth.

4. The revolving seed-hopper F, provided with the rotating rack-plate $n$, combined with the hook-bar $m$, and the vibrating lever J, actuated by pins $k$ $k$ set in the wheel H, substantially as set forth.

LEWIS DEFENBAUGH.

Witnesses:
 HENRY STYER,
 JESSE T. TURNER.